United States Patent [19]

Brockmann et al.

[11] Patent Number: 4,637,857
[45] Date of Patent: Jan. 20, 1987

[54] PROCESS FOR THE REMOVAL OF RESIDUAL CONSTITUENTS

[75] Inventors: Rolf Brockmann, Duesseldorf; Clemens Casper, Krefeld; Walter Damsky, Krefeld; Axel Lippert, Krefeld; Johannes O. Sajben, Krefeld, all of Fed. Rep. of Germany

[73] Assignee: Bayer Aktiengesellschaft, Leverkusen, Fed. Rep. of Germany

[21] Appl. No.: 671,263

[22] Filed: Nov. 14, 1984

Related U.S. Application Data

[63] Continuation of Ser. No. 452,540, Dec. 23, 1982, abandoned, which is a continuation of Ser. No. 61,207, Jul. 27, 1979, abandoned, which is a continuation-in-part of Ser. No. 900,678, Apr. 27, 1978, abandoned.

[30] Foreign Application Priority Data

May 4, 1977 [DE] Fed. Rep. of Germany ....... 2719968

[51] Int. Cl.$^4$ .......................... B01D 1/14; B01D 1/22
[52] U.S. Cl. .................................... 159/47.1; 159/49; 159/DIG. 10; 528/500
[58] Field of Search ............. 159/DIG. 10, 16.3, 16.1, 159/47.1, 49, 13 C; 528/500

[56] References Cited

U.S. PATENT DOCUMENTS

| | | | |
|---|---|---|---|
| 2,467,769 | 4/1949 | Morrow et al. | 159/DIG. 10 |
| 3,280,010 | 10/1966 | Creighton et al. | |
| 3,550,669 | 12/1970 | Lippert et al. | 159/6 |
| 3,605,872 | 9/1971 | Brault | 159/16.3 |
| 3,915,712 | 10/1975 | Hewzhoff et al. | |

Primary Examiner—S. Leon Bashore
Assistant Examiner—Andrew J. Anderson
Attorney, Agent, or Firm—Gene Harsh; Joseph C. Gil

[57] ABSTRACT

The instant invention is directed to a process for stripping of a residual component from a liquid having a viscosity of from 300 to 10,000 poises in which the liquid flows in the form of a ring flow supported by a gas stream flowing in the core, through a tube into a separator vessel, the tube having a continuous coil shape and a conduit diameter to helix diameter of from 0.1:1 to 0.04:1, the improvement comprising adding to the gas stream from 10 to 90%, by weight, of externally generated steam and/or an inert gas at an adjusted pressure of from 50 m bars to 1 bar in the separator vessel for a gas and/or steam velocity in the tube of from 100 m/sec to the speed of sound. The added gas and/or steam generates thorough transverse mixing in the liquid ring flow.

3 Claims, 1 Drawing Figure

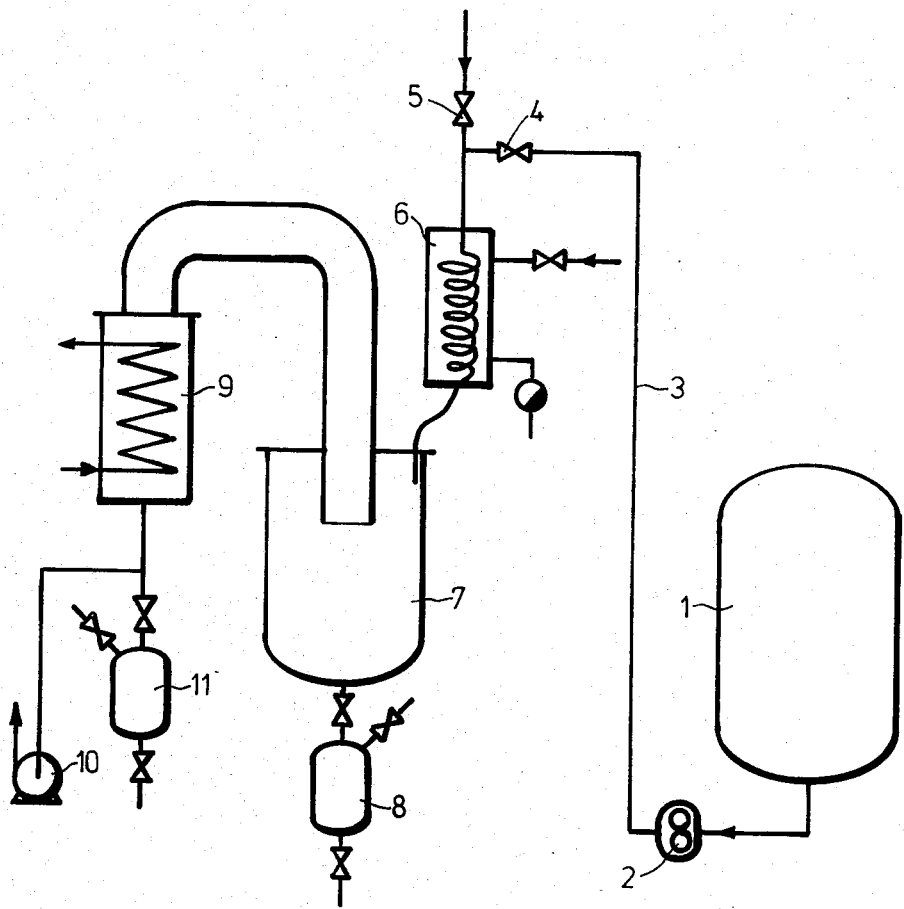

PROCESS FOR THE REMOVAL OF RESIDUAL CONSTITUENTS

CROSS REFERENCE TO RELATED APPLICATION

This application is a continuation of application Ser. No. 452,540 filed Dec. 23, 1982, now abandoned, which itself is a continuation of application Ser. No. 061,207 filed July 27, 1979, now abandoned, which is a continuation-in-part of application Ser. No. 900,678 filed Apr. 27, 1978, now abandoned.

This invention relates to a process for the removal of residual constituents of a component from a liquid product having a viscosity of from 20 to 10,000 poises which flows through a tubular coil in the form of a ring flow supported by a gas stream flowing in the core.

BACKGROUND OF THE INVENTION

For reasons associated with pollution control, production or end-use, chemical products are nowadays required to show a high degree of purity which may be obtained, inter alia, by driving off residual monomers after polymerization, separating off solvent residues, removing impurities or by completely dehydrating products.

Hitherto, thin layer evaporators working in vacuo have been used for the evaporation of residual constituents.

In these processes, the product is in danger of foaming. The costs involved in working in a vacuum are high. The rotating elements impair reliability in operation and involve high maintenance costs.

Stripper columns in which steam entrains the low-boiling constituents are also used. Stripper columns are unsuitable for highly viscous substances. In addition to high investment costs, the outlay in energy is considerable.

In falling-film evaporators, a thin film of liquid flows downwards along the inner tube walls. Falling-film evaporators cannot be used for liquids of high viscosity. At high rates of gas flow, droplets of liquid are entrained so that removal of the residual constituents is irregular. This reduces purity. The structurally possible tube lengths only allow a limited residence time.

A tubular coil evaporator is also known in which, by heating the tube from outside, vapor is driven off from the ring flow on the inner wall and is entrained by the vapor stream U.S. Pat. No. 3,550,669). In tubular coil evaporators, a certain quantity has to evaporate in order to produce the gas stream required for the completion of the process. This requirement cannot be satisfied by the removal of residual constituents because the nearer the thermal equilibrium is approached, the lower the degree of evaporation. Displacement by applying a vacuum is only possible to a limited extent. The speed of sound is reduced in a vacuum and cannot be exceeded in the tube. Accordingly, it is only possible to obtain a low degree of purity by this process.

Accordingly, an object of the present invention is to provide a continuous process carried out in a static apparatus by which it is possible to carefully remove undesirable residual constituents in order to obtain a high degree of purity in the compound produced.

DESCRIPTION OF THE INVENTION

These objects are achieved according to the present invention by a process for stripping of a residual component from a liquid having a viscosity of from 20 to 10,000 poises, and preferably having a viscosity of from 500 to 10,000 poises, in which the liquid flows through a continuously coiled tube in the form of a ring flow supported by a gas stream flowing in the core, said coiled tube having a ratio of conduit diameter to helix diameter of from 0.1:1 to 0.04:1 and preferably from 0.075:1 to 0.09:1 comprising adding to said gas stream from 10 to 90%, by weight, of externally generated steam and/or an inert gas at an adjusted pressure of from 50 m bars to 1 bar in the separator vessel for a gas velocity of from 20 m/sec to the speed of sound and preferably having a gas velocity greater than 100 m/sec.

It has surprisingly been found that undesirable residual constituents, such as water, monomers, and other impurities, etc. may be almost completely removed by this process, even from highly viscous product liquids. The partial pressure of the residual constituents and hence the degree of purity may be adjusted to any required extent by the addition of steam, inert gas and/or other gases. The circular flow superimposed upon the longitudinal flow between the surface of the liquid and the wall of the tube provides for an intensive mass transport and a direct heat exchange with the gas stream or through the wall of the tube. Only short residence times are then required. This is a particular advantage in the case of heat-sensitive products. It is possible in this way to avoid the need to apply an expensive vacuum and, hence, the danger of foaming.

By virtue of their high purity, the products obtained are substantially odorless. This increases their market value.

The tubular coil in which there is no break at any point has only static elements which are operationally reliable and easy to maintain.

One embodiment of the present invention is illustrated in the accompanying flow chart and described in more detail in the following.

The test installation consists of the following individual apparatus: a heatable 500 liter vessel, 1, as receiver; a variable-speed gear pump, 2; a delivery pipe, 3, heated by creeping steam; a throttle valve, 4; a steam feed, 5; a tubular coil, 6; a glass container, 7, acting as separator; a glass container, 8, acting as a vacuum discharge lock; a brine-cooled condenser, 9; a water ring pump with a gas injector, 10; and a condensate collecting vessel, 11.

The product to be evaporated is delivered by the gear pump, 2, to the tubular coil, 6. The pressure upstream of the tubular coil may be adjusted by the throttle valve, 4, in such a way that evaporation begins after the constriction. A two-phase flow thus develops in the tubular coil, 6. The liquid flows along the wall of the tube in the form of a ring flow and is further transported by the steam (gas) flowing at high velocity inside the tube. A circular flow between the wall of the tube and the surface of the liquid is developed transversely thereof. Vapor and evaporated product are separated in the separation vessel, 7. The vapor is deposited in the condenser, 9, and the product is brought to normal pressure through the discharge vessel, 8.

The test results are shown in the following Table.

EXAMPLE I

| | |
|---|---|
| Purpose | removal of monomers |
| Product | acrylic resin |

| -continued | |
|---|---|
| Volatile constituents | from 4.5 to 5%, by weight of monomers |
| Product throughput | 10 kg/hr |
| Gas/vapor | 4.5 M³/hr N₂ |
| Temperature | 200° C. |
| Pressure | 700 mbars |
| Tube length | 6 m |
| Tube diameter | 15 mm |
| Tube diameter/helix diameter | 0.1 |
| Result | monomers undetectable |
| Viscosity | 300 poise. |

EXAMPLE II

| | |
|---|---|
| Purpose | removal of monomers |
| Product | siloprenoil |
| Volatile constituents | 10% by weight of monomers |
| Product throughput | 2.5 kg/hr |
| Gas/vapor | 10 kg/hr N₂ |
| Temperature | 230° C. |
| Pressure (Separator) | 125 mbars |
| Tube length | 2 m |
| Tube diameter | 15 mm |
| Tube diameter/helix diameter | 0.075:1 |
| Result | 100 ppm monomers |
| Viscosity | 10,000 poise. |

What is claimed is:

1. A process for stripping a residual component from a liquid having a viscosity of from 300 to 10,000 poises comprising: flowing the liquid in the form of a ring flow supported by a gas stream in the center of the ring through a heated tube having a continuous helix shape and a tube diameter to helix diameter ratio of from 0.1:1 to 0.04:1 into a separator vessel; and adding to said gas stream from 10 to 90%, by weight, of externally generated steam and/or an inert gas at an adjusted pressure of from 50 m bars to 1 bar in said separator vessel for a gas and/or steam velocity in said tube of from 100 m/sec to the speed of sound, wherein said added gas and/or steam is sufficient in quantity and velocity such that a circular flow between the wall of the tube and the surface of the liquid is developed transversely thereof providing thorough transverse mixing of the liquid ring flow.

2. The process of claim 1 wherein the said ratio is from 0.075:1 to 0.09:1.

3. The process of claim 1 wherein the said viscosity is from 500 to 10,000 poises.

* * * * *